(12) United States Patent
Sydow

(10) Patent No.: US 11,907,333 B2
(45) Date of Patent: Feb. 20, 2024

(54) SYSTEMS AND METHODS OF GROUPING SYSTEM LOGS USING UNSUPERVISED MACHINE LEARNING

(71) Applicant: Dell Products L.P., Round Rock, TX (US)

(72) Inventor: David Sydow, Merrimack, NH (US)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 17/858,135

(22) Filed: Jul. 6, 2022

(65) Prior Publication Data
US 2024/0012878 A1    Jan. 11, 2024

(51) Int. Cl.
| | |
|---|---|
| G06F 7/00 | (2006.01) |
| G06F 18/2135 | (2023.01) |
| G06F 16/35 | (2019.01) |
| G06F 40/216 | (2020.01) |
| G06F 18/22 | (2023.01) |

(52) U.S. Cl.
CPC .......... *G06F 18/2135* (2023.01); *G06F 16/35* (2019.01); *G06F 18/22* (2023.01); *G06F 40/216* (2020.01)

(58) Field of Classification Search
CPC ...... G06F 16/35; G06F 16/3334; G06F 16/38; G06F 16/355; G06F 16/313; G06F 16/93; G06F 18/2135; G06F 18/22; G06F 40/216; G06F 40/284; G06F 40/295; G06F 40/30; G06F 9/544
See application file for complete search history.

(56) References Cited

U.S. PATENT DOCUMENTS

| | | | |
|---|---|---|---|
| 9,836,461 B1* | 12/2017 | Mishne | G06F 16/93 |
| 10,402,249 B2 | 9/2019 | Xiao et al. | |
| 10,956,059 B2 | 3/2021 | Thakkar et al. | |
| 11,176,464 B1 | 11/2021 | Sagi et al. | |
| 11,301,355 B2 | 4/2022 | Gong et al. | |
| 11,341,026 B2 | 5/2022 | De Abreu Pinho et al. | |
| 2017/0139914 A1* | 5/2017 | Newman | H04L 51/42 |
| 2019/0244175 A1* | 8/2019 | Ogrinz | G06Q 10/063 |
| 2020/0110815 A1* | 4/2020 | Garapati | G06F 16/3334 |
| 2020/0112475 A1* | 4/2020 | Garapati | H04L 41/0631 |
| 2021/0089377 A1* | 3/2021 | Wang | G06F 11/0709 |

* cited by examiner

*Primary Examiner* — Mohammad A Sana
(74) *Attorney, Agent, or Firm* — BainwoodHuang

(57) ABSTRACT

Techniques for grouping system logs using machine learning. The techniques include deriving an input matrix from the logs, in which rows represent the logs and columns represent unique words in the logs. The techniques include applying a TF-IDF algorithm to the input matrix and deriving a TF-IDF matrix from the TF-IDF algorithm output. The TF-IDF matrix reflects how important the unique words are to the respective logs. The techniques include applying a PCA algorithm to the TF-IDF matrix and deriving a PCA matrix having a reduced dimensionality from the PCA algorithm output. The techniques include applying a Cosine Similarity algorithm to the PCA matrix and deriving CS matrices from the CS algorithm output. Each CS matrix reflects the cosine similarity of a respective log relative to all the other logs. The techniques include applying a clustering algorithm to the CS matrices and deriving log groupings from the clustering algorithm output.

20 Claims, 6 Drawing Sheets

400a

```
cyc-coreos systemd: Starting User Manager for UID 500...
cyc-coreos systemd: Started User Manager for UID 500.
cyc-coreos systemd: Starting User Manager for UID 500...
```

```
cyc-coreos BSC_fireman: [MainThread]:fireman.py:496:INFO: starting service handler fireman cyc-coreos BSC_fireman: [MainThread]:fireman.py:497:INFO: svc_hdl_ready_event <threading._Event object at >, fireman_zmq_name fireman cyc-coreos BSC_fireman: [MainThread]:fireman.py:516:INFO: ipc_svc_hdl <zmqmsgsvc.threadsafeservicehandler.ThreadSafeServiceHandler object at > cyc-coreos BSC_fireman: [Thread-33]:serverutils.py:119:INFO: Service handler for serviceName: fireman Running. Listening for requests over: ipc:///tmp/zmq_server_request_BSC_zmq_server.sock, publishing responses to: ipc:///tmp/zmq_server_event_BSC_zmq_server.sock cyc-coreos BSC_fireman: [MainThread]:fireman.py:518:INFO: finished zmq_registration
```

```
Mar 04 15:58:55 FNM00183501315-A cyc_crypto[15090]: Events received from epoll: ['IN_ACCESS']
Mar 04 15:58:55 FNM00183501315-A cyc_crypto[15090]: Events received from epoll: ['IN_ACCESS']

Mar 04 15:58:55 FNM00183501315-A cyc_crypto[15090]: Events received from epoll: ['IN_ACCESS']

Mar 04 15:58:55 FNM00183501315-A cyc_crypto[15090]: Events received from epoll: ['IN_ACCESS']
```

```
cyc-coreos ipsec: install failed: configuration name not found cyc-coreos ipsec: install failed: configuration name not found cyc-coreos ipsec: install failed: configuration name not found cyc-coreos ipsec: install failed: configuration name not found
```

*Fig. 4d*

SYSTEMS AND METHODS OF GROUPING SYSTEM LOGS USING UNSUPERVISED MACHINE LEARNING

BACKGROUND

Storage systems include storage processors and storage arrays that contain storage devices such as solid-state drives (SSDs), hard disk drives (HDDs), and/or optical drives. The storage processors perform operations such as input/output (IO) operations in response to requests from storage clients communicably coupled to the storage processors. The IO operations cause data blocks, data pages, data files, and/or other data elements specified in the requests to be read from or written to volumes, logical units, filesystems, and/or other storage objects maintained on the storage devices. The operations performed by the storage processors are accomplished in most part by software systems that have numerous software components, at least some of which may be subject to failure or abnormal operation over time. Information pertaining to such failure or abnormal operation is typically saved in one or more system log files configured to include system log messages that detail events occurring at the relevant software components.

SUMMARY

Unfortunately, saving information pertaining to normal or abnormal operation of software components in system log files (or "log files") can be problematic in large, complex enterprise storage systems due to the sheer size of the log files, which can include a multitude of system log messages (or "log messages," "logs"). To determine root causes of abnormal operations of software components, system support personnel first parse the multitude of logs to identify the software components specified in the logs. Further, because log data can be unstructured and derived from many different software components or other sources, system support personnel often manually sort, classify, categorize, or group the multitude of logs before triaging the logs. Such activities performed by system support personnel can not only require specialized knowledge of the software system, but also significantly increase the time-to-resolution (TTR) of issues related to the software system.

Techniques are disclosed herein for more efficiently sorting, classifying, categorizing, or grouping system log messages (or "logs") in a storage system using unsupervised machine learning (ML). The disclosed techniques can include deriving an input matrix from a dataset of logs included in at least one log file. The input matrix can include rows that represent the respective logs and columns that represent unique words, abbreviations, and/or other character strings (or "unique terms") included in the respective logs. The disclosed techniques can further include applying a TF-IDF (Term Frequency—Inverse Document Frequency) algorithm to the input matrix and deriving a TF-IDF matrix from an output of the TF-IDF algorithm. The TF-IDF matrix can include rows that represent the respective logs, columns that represent the unique terms included in the respective logs, as well as information about how important the unique terms are to the respective logs. The disclosed techniques can further include transforming sparse elements of the TF-IDF matrix to a dense matrix to reduce memory requirements, applying a PCA (Principal Component Analysis) algorithm to the TF-IDF matrix to reduce computational requirements, and deriving a PCA matrix from an output of the PCA algorithm. Like the TF-IDF matrix, the PCA matrix can include rows that represent the respective logs, columns that represent the unique terms included in the respective logs, and information about how important the unique terms are to the respective logs, but have a reduced dimensionality within the dataset of logs. The disclosed techniques can further include applying a CS (Cosine Similarity) algorithm to the PCA matrix and deriving a plurality of CS vectors from an output of the CS algorithm. Each CS vector can include distance (or "similarity") scores for a respective log relative to all the other logs included in the log file. The disclosed techniques can further include applying a clustering algorithm to the CS vectors, deriving a plurality of groupings of the logs from an output of the clustering algorithm, and storing and/or displaying the plurality of log groupings to system support personnel for subsequent triage and analysis.

In certain embodiments, a method includes deriving an input matrix from a dataset of system log messages included in at least one system log file of a storage system. The input matrix includes rows representing the system log messages, columns representing unique terms included in the system log messages, and counts of the unique terms in each of the system log messages. The method further includes applying a Term Frequency—Inverse Document Frequency (TF-IDF) algorithm to the input matrix to derive a TF-IDF matrix. The TF-IDF matrix includes importance values for the unique terms in each of the system log messages. The method further includes applying a Cosine Similarity (CS) algorithm to the TF-IDF matrix to derive a plurality of CS vectors. Each CS vector includes similarity scores for a respective one of the system log messages relative to all the other system log messages included in the at least one system log file. The method further includes applying a clustering algorithm to the plurality of CS vectors to obtain groupings of the system log messages, and, having derived the groupings of the system log messages, storing and/or displaying the groupings to a user for triage and/or analysis.

In certain arrangements, the method includes reducing a dimensionality of the TF-IDF matrix.

In certain arrangements, the method includes applying a Principal Component Analysis (PCA) algorithm to the TF-IDF matrix.

In certain arrangements, the method includes applying an output of the PCA algorithm as input to the CS algorithm to derive the plurality of CS vectors.

In certain arrangements, the output of the PCA algorithm includes a plurality of summary indices referred to as "principal components," and a total number of the principal components is approximately two times a number of groupings of the system log messages.

In certain arrangements, the TF-IDF matrix is configured as a sparse TF-IDF matrix. The method further includes transforming the sparse TF-IDF matrix into a dense TF-IDF matrix, and applying the CS algorithm to the dense TF-IDF matrix to derive the plurality of CS vectors.

In certain arrangements, the method includes specifying a fixed number of groupings of the system log messages, and applying the clustering algorithm to the plurality of CS vectors to obtain the fixed number of groupings of the system log messages.

In certain arrangements, the method includes specifying a minimum number of groupings of the system log messages, and applying the clustering algorithm to the plurality of CS vectors to obtain at least the minimum number of groupings of the system log messages.

In certain embodiments, a system includes a memory and processing circuitry configured to execute program instructions out of the memory to derive an input matrix from a dataset of system log messages included in at least one system log file of a storage system. The input matrix includes rows representing the system log messages, columns representing unique terms included in the system log messages, and counts of the unique terms in each of the system log messages. The processing circuitry is further configured to execute the program instructions out of the memory to apply a Term Frequency—Inverse Document Frequency (TF-IDF) algorithm to the input matrix to derive a TF-IDF matrix. The TF-IDF matrix includes importance values for the unique terms in each of the system log messages. The processing circuitry is further configured to execute the program instructions out of the memory to apply a Cosine Similarity (CS) algorithm to the TF-IDF matrix to derive a plurality of CS vectors. Each CS vector includes similarity scores for a respective one of the system log messages relative to all the other system log messages included in the at least one system log file. The processing circuitry is further configured to execute the program instructions out of the memory to apply a clustering algorithm to the plurality of CS vectors to obtain groupings of the system log messages, and, having derived the groupings of the system log messages, store and/or display the groupings to a user for triage and/or analysis.

In certain arrangements, the processing circuitry is further configured to execute program instructions out of the memory to reduce a dimensionality of the TF-IDF matrix.

In certain arrangements, the processing circuitry is further configured to execute program instructions out of the memory to apply a Principal Component Analysis (PCA) algorithm to the TF-IDF matrix.

In certain arrangements, the processing circuitry is further configured to execute program instructions out of the memory to apply an output of the PCA algorithm as input to the CS algorithm to derive the plurality of CS vectors.

In certain arrangements, the output of the PCA algorithm includes a plurality of summary indices referred to as "principal components," and a total number of the principal components is approximately two times a number of groupings of the system log messages.

In certain arrangements, the TF-IDF matrix is configured as a sparse TF-IDF matrix, and the processing circuitry is further configured to execute the program instructions out of the memory to transform the sparse TF-IDF matrix into a dense TF-IDF matrix, and to apply the CS algorithm to the dense TF-IDF matrix to derive the plurality of CS vectors.

In certain arrangements, the processing circuitry is further configured to execute program instructions out of the memory to specify a fixed number of groupings of the system log messages, and to apply the clustering algorithm to the plurality of CS vectors to obtain the fixed number of groupings of the system log messages.

In certain arrangements, the processing circuitry is further configured to execute program instructions out of the memory to specify a minimum number of groupings of the system log messages, and to apply the clustering algorithm to the plurality of CS vectors to obtain at least the minimum number of groupings of the system log messages.

In certain embodiments, a computer program product includes a set of non-transitory, computer-readable media having instructions that, when executed by processing circuitry, cause the processing circuitry to perform a method that includes deriving an input matrix from a dataset of system log messages included in at least one system log file of a storage system. The input matrix includes rows representing the system log messages, columns representing unique terms included in the system log messages, and counts of the unique terms in each of the system log messages. The method further includes applying a Term Frequency—Inverse Document Frequency (TF-IDF) algorithm to the input matrix to derive a TF-IDF matrix. The TF-IDF matrix includes importance values for the unique terms in each of the system log messages. The method further includes applying a Cosine Similarity (CS) algorithm to the TF-IDF matrix to derive a plurality of CS vectors. Each CS vector includes similarity scores for a respective one of the system log messages relative to all the other system log messages included in the at least one system log file. The method further includes applying a clustering algorithm to the plurality of CS vectors to obtain groupings of the system log messages, and, having derived the groupings of the system log messages, storing and/or displaying the groupings to a user for triage and/or analysis.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIGS. 4a, 4b, 4c, and 4d are four (4) exemplary groupings of system log messages derived from an output of a clustering algorithm executed by the storage system of FIG. 1.

DETAILED DESCRIPTION

Techniques are disclosed herein for more efficiently sorting, classifying, categorizing, or grouping system log messages (or "log messages," "logs") in a storage system using unsupervised machine learning (ML). The disclosed techniques can include deriving an input matrix from a dataset of logs included in at least one log file, in which rows of the input matrix represent the respective logs and columns of the input matrix represent unique words, abbreviations, and/or other character strings (or "unique terms") included in the respective logs. The disclosed techniques can further include applying a TF-IDF (Term Frequency—Inverse Document Frequency) algorithm to the input matrix and deriving a TF-IDF matrix from an output of the TF-IDF algorithm. The TF-IDF matrix can include information about how important the unique terms are to the respective logs. The disclosed techniques can further include applying a PCA (Principal Component Analysis) algorithm to the TF-IDF matrix and deriving a PCA matrix from an output of the PCA algorithm. The PCA matrix can have a reduced dimensionality within the dataset of logs. The disclosed techniques can further include applying a CS (Cosine Similarity) algorithm to the PCA matrix and deriving a plurality of CS vectors from an output of the CS algorithm. Each CS vector can include information about a cosine similarity of a respective log relative to all the other logs included in the log file. The disclosed techniques can further include applying a clustering algorithm to the CS vectors, deriving a plurality of groupings of the logs from an output of the clustering algorithm, and storing and/or displaying the plurality of log groupings to system support personnel for subsequent triage and analysis.

Figure 1:
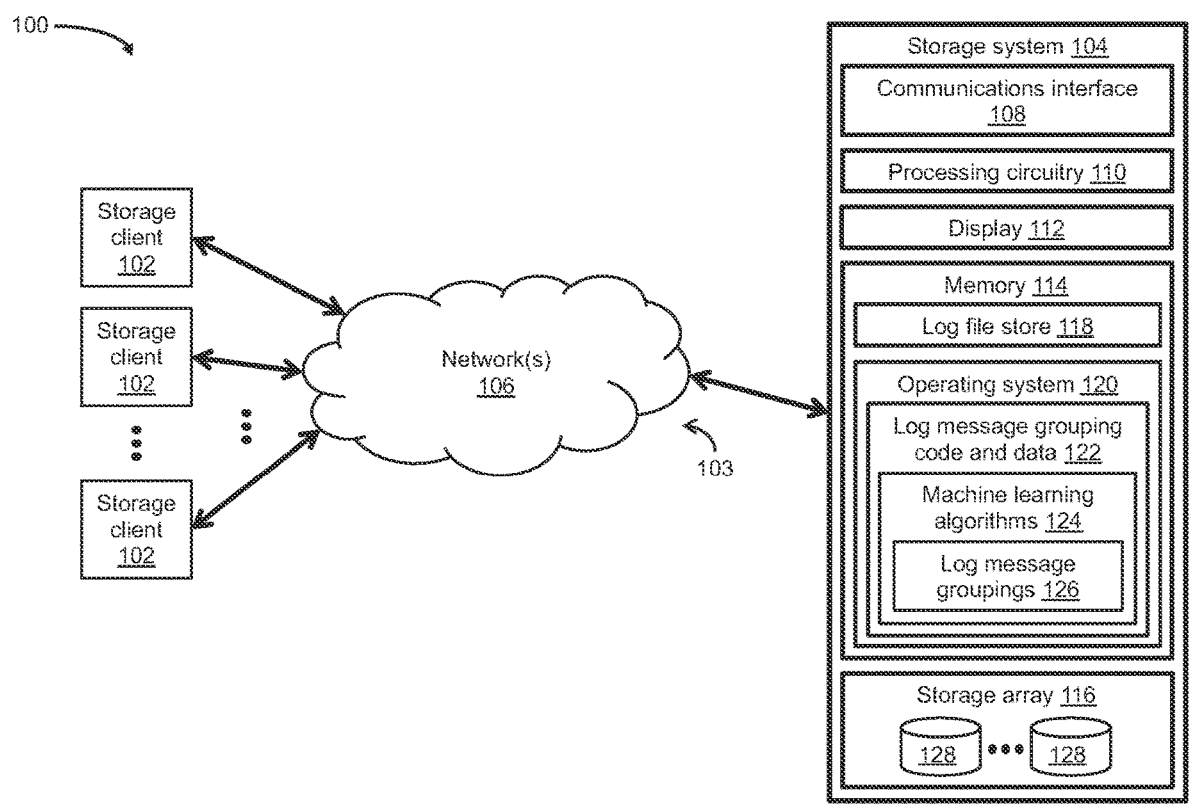
FIG. 1 is a block diagram of an exemplary storage environment, in which techniques can be practiced for sorting, classifying, categorizing, or grouping system log messages in a storage system using unsupervised machine learning (ML)

FIG. 1 depicts an illustrative embodiment of an exemplary storage environment 100, in which techniques can be practiced for more efficiently sorting, classifying, categorizing, or grouping system log messages in a storage system using unsupervised machine learning (ML). As shown in FIG. 1, the storage environment 100 can include a plurality of storage client computers (or "storage client(s)") 102 communicably coupled to a storage system 104 by a communications medium 103, which can include at least one network 106. For example, each of the plurality of storage clients 102 may be configured as an email server computer, a file server computer, a web server computer, and/or any other suitable client computer, server computer, or computerized device. The storage clients 102 can be further configured to provide, over the network(s) 106, storage input/output (IO) requests (e.g., small computer system interface (SCSI) commands, network file system (NFS) commands) to the storage system 104. In response to the storage IO requests (e.g., read IO requests, write IO requests), one or more storage processors of the storage system 104 can perform operations such as IO operations (e.g., read IO operations, write IO operations), which cause data blocks, data pages, data files, and/or any other suitable data elements specified in the storage IO requests to be read from or written to volumes, logical units, filesystems, and/or any other suitable storage objects maintained on one or more storage devices 128. The storage system 104 can be configured as a standalone storage system including a single storage appliance, a clustered storage system including two or more storage appliances, a cloud-based storage system, or any other suitable storage appliance or system.

The communications medium 103 can be configured to interconnect the storage clients 102 with the storage system 104 to enable them to communicate and exchange data and control signaling. As shown in FIG. 1, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

As shown in FIG. 1, the storage system 104 can include a communications interface 108, one or more storage processors (or, more generally, "processing circuitry") 110, a display 112, at least one memory 114, and a storage array 116. The communications interface 108 can include an Ethernet interface, an InfiniBand interface, a Fiber Channel interface, and/or any other suitable communications interface. The communications interface 108 can further include SCSI target adapters, network interface adapters, and/or any other suitable adapters for converting electronic, optical, and/or wireless signals received over the network(s) 106 to a form suitable for use by the processing circuitry 110.

The processing circuitry 110 can be configured to process storage IO requests (e.g., read requests, write IO requests) issued by the plurality of storage clients 102 and store client data in a redundant array of independent disk (RAID) environment implemented on the storage array 116. The storage array 116 can include the storage devices 128 such as solid-state drives (SSDs), hard disk drives (HDDs), optical drives, flash drives, hybrid drives, and/or any other suitable storage drive(s) or device(s). The storage devices 128 can be configured to store volumes, logical units, filesystems, and/or any other suitable storage objects for hosting data storage of client applications (e.g., email client applications, file client applications, web client applications) running on the respective storage clients 102.

The memory 114 can include persistent memory (e.g., flash memory, magnetic memory) and non-persistent memory (e.g., dynamic random-access memory (DRAM), static random-access memory (SRAM)). The memory 114 can further include a log file store 118, an operating system (OS) 120 such as a Linux OS, Unix OS, Windows OS, or any other suitable operating system, as well as a variety of software constructs realized in the form of specialized code and data such as log message grouping code and data 122. As shown in FIG. 1, the log message grouping code and data 122 can include a plurality of machine learning (ML) algorithms 124, which can be configured to ultimately produce a plurality of groupings of log messages (or "log groupings") 126 for various software components. The log messages can be included in one or more log files maintained in the log file store 118. The ML algorithms 124 can be configured to perform unsupervised machine learning (or "unsupervised ML") to analyze and cluster unlabeled datasets of logs, thereby obtaining the log groupings 126 substantially without the need for user intervention.

For example, the plurality of ML algorithms 124 may include a TF-IDF (Term Frequency—Inverse Document Frequency) algorithm, a PCA (Principal Component Analysis) algorithm, a CS (Cosine Similarity) algorithm, a clustering algorithm, and/or any other suitable ML algorithm 124. The TF-IDF algorithm is configured to compute a TF-IDF matrix of importance values that reflect how important certain unique words, abbreviations, and/or character strings (or "unique terms") are to a log in a dataset of logs included in a log file. The importance values in the TF-IDF matrix can increase proportionally to the number of times a unique term appears in the log, but be offset by the number of logs in the dataset that include the unique term. The PCA algorithm is configured to compute, from the TF-IDF matrix, a PCA matrix that has a reduced dimensionality relative to the TF-IDF matrix. The CS algorithm is configured to compute a plurality of CS vectors, in which each CS vector includes distance (or "similarity") scores for a respective log relative to all the other logs in the dataset. Each such similarity score can correspond to the geometric distance between a numerical representation of the respective log relative to the other logs in the dataset. The clustering algorithm is configured to analyze the CS vectors of similarity scores and to sort, classify, categorize, or group the logs in the dataset based on the analysis. For example, the clustering algorithm may be a k-means algorithm, a Density-Based Spatial Clustering of Applications with Noise (DB- SCAN) algorithm, a Hierarchical DBSCAN (HDBSCAN) algorithm, or any other suitable clustering algorithm. The log message grouping code and data 122 can be executed by the processing circuitry 110 to carry out the techniques and/or methods disclosed herein.

In the context of the processing circuitry 110 being configured to execute specialized code and data (e.g., program instructions) out of the memory 114, a computer program product can be configured to deliver all or a portion of the program instructions and/or data to the processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 110, the various techniques and/or methods disclosed herein.

During operation, the disclosed techniques can more efficiently sort, classify, categorize, or group log messages (or "logs") in the storage system 104 using unsupervised ML. The disclosed techniques can derive an input matrix from a dataset of logs included in at least one log file, apply the TF-IDF algorithm to the input matrix, and derive a TF-IDF matrix from an output of the TF-IDF algorithm. Further, the disclosed techniques can transform sparse elements of the TF-IDF matrix to a dense matrix to reduce memory requirements, apply the PCA algorithm to the TF-IDF matrix to reduce computational requirements, and derive a PCA matrix from an output of the PCA algorithm. In addition, the disclosed techniques can apply the CS algorithm to the PCA matrix, derive a plurality of CS vectors from an output of the CS algorithm, and apply the clustering algorithm to the CS vectors. Having applied the clustering algorithm to the CS vectors, the disclosed techniques can derive the plurality of log groupings 126 from an output of the clustering algorithm, and store and/or display the plurality of log groupings 126 to system support personnel on the display 112 for subsequent triage and analysis.

Figure 2:
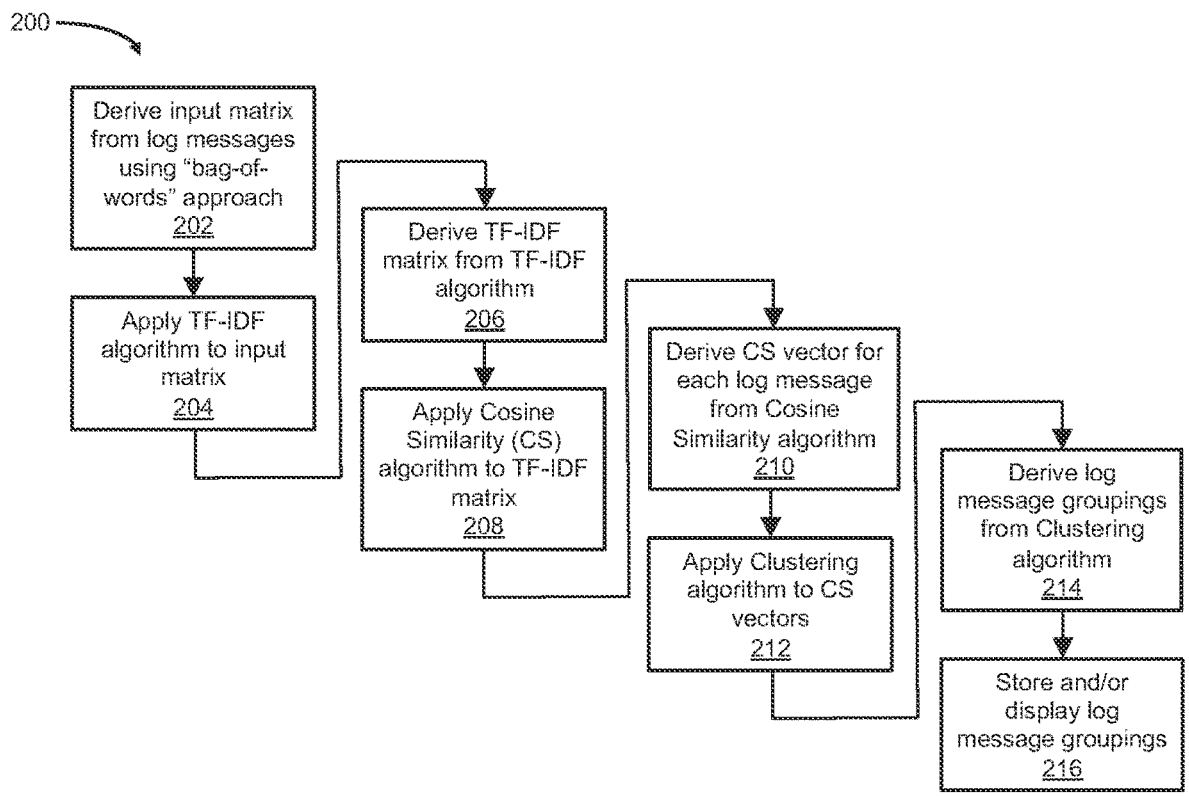
FIG. 2 is a diagram of a first exemplary flow of actions or operations that can be performed by the storage system of FIG. 1 for sorting, classifying, categorizing, or grouping the system log messages using unsupervised ML.

The disclosed techniques for more efficiently sorting, classifying, categorizing, or grouping system log messages (or "logs") in a storage system using unsupervised ML will be further understood with reference to the following first illustrative example and FIGS. 1 and 2. In this first example, it is assumed that actions or operations performed by the processing circuitry 110 of the storage system 104 (see FIG. 1) are accomplished in most part by software systems that have numerous software components, at least some of which may be subject to failure or abnormal operation over time. It is further assumed that information pertaining to normal and/or abnormal operation of the software components is saved in the log file store 118 in at least one log file, which is configured to include multiple logs that detail events occurring at the relevant software components.

FIG. 2 depicts a first exemplary flow of actions or operations performed by the processing circuitry 110 for sorting, classifying, categorizing, or grouping the logs using unsupervised ML. As depicted in block 202, the processing circuitry 110 derives an input matrix from a dataset of "N" logs ("N" being a positive integer) included in the log file using a "bag-of-words" approach. In this first example, the input matrix includes rows that represent the N logs, columns that represent "T" unique words, abbreviations, and/or other character strings (or "unique terms") ("T" being a positive integer) included in the N logs, and counts of the T unique terms in each of the N logs. For example, each row dimension "N" of the input matrix may represent, for a respective log, a vector formed from the counts of the T unique terms in the respective log. As depicted in block 204, the processing circuitry 110 applies the TF-IDF algorithm to the input matrix, and, as depicted in block 206, derives a TF-IDF matrix from an output of the TF-IDF algorithm. Like the input matrix, the TF-IDF matrix includes rows that represent the N logs included in the log file and columns that represent the T unique terms included in the N logs. It is noted that the TF-IDF matrix can conceptually be viewed as a matrix of size "NxT." For example, "N" may have a positive integer value of up to 1,000,000 or more and "T" may have a positive integer value of up to 300,000 or more.

Unlike the input matrix, however, the TF-IDF matrix further includes information about how important the unique terms are to the respective logs. In this first example, such importance of the unique terms is determined based on two factors, namely, the Term Frequency (TF) and the Inverse Document Frequency (IDF) of the unique terms. The Term Frequency (TF) corresponds to a value that represents how frequently a unique term occurs in a log, and the Inverse Document Frequency (IDF) corresponds to a weighted offset value that can be applied to the TF value. For example, the Term Frequency (TF) may be obtained, for each unique term, by dividing the count of the unique term included in a log by the total number of unique terms included in the log. Further, the Inverse Document Frequency (IDF) may be obtained, for each unique term, by taking the logarithm of the total number of logs included in the log file divided by the number of logs that include the unique term. Having obtained the Term Frequency (TF) and the Inverse Document Frequency (IDF) for each unique term, the product of the TF value and the IDF value, "TF*IDF," can be obtained for the unique term. For example, each row dimension "N" of the TF-IDF matrix may conceptually be viewed, for a respective log, as a vector formed from the TF*IDF values (or "importance values") obtained for the unique terms included in the respective log. In a practical application, an exemplary TF-IDF matrix (or a portion thereof) may be expressed, as follows:

$$\begin{bmatrix} (0, 11013) & 0.13286417266645626 \\ (0, 15038) & 0.0882588428775003 \\ (0, 11588) & 0.0882588428775003 \\ (0, 909) & 0.06294423050952791 \\ (0, 6323) & 0.1430595847281993 \\ & \vdots \end{bmatrix}, \quad (1)$$

in which "(0, 11013)" corresponds to a pair of lines from the log file, namely, line "0" containing log "0" (i.e., N=0) and line "11013" containing log "11013" (i.e., N=11013), and the value "0.13286417266645626" represents a combination of the offset-weighted TF values for the unique terms in log 0 and log 11013 and reflects the similarity between the logs 0 and 11013. Likewise, "(0, 15038)" corresponds to a pair of lines from the log file, namely, line "0" containing log "0" and line "15038" containing log "15038" (i.e., N=15038), and the value "0.0882588428775003" reflects the similarity between the logs 0 and 15038; "(0, 11588)" corresponds to a pair of lines from the log file, namely, line "0" containing log "0" and line "11588" containing log "11588" (i.e., N=11588), and the value "0.0882588428775003" reflects the similarity between the logs 0 and 11588; "(0, 909)" corresponds to a pair of lines from the log file, namely, line "0" containing log "0" and line "909" containing log "909" (i.e., N=909), and the value "0.06294423050952791" reflects the similarity between the logs 0 and 909; and "(0, 6323)" corresponds to a pair of lines from the log file, namely, line "0" containing log "0" and line "6323" containing log "6323" (i.e., N=6323), and the value "0.1430595847281993" reflects the similarity between the logs 0 and 6323. It is noted that, in the exemplary TF-IDF matrix (see reference numeral (1) above), log 0 has the same level of similarity with log 15038 and log 11588, as reflected by the value 0.0882588428775003. It should be noted that sparse elements of the TF-IDF matrix can be transformed to a dense matrix to reduce memory requirements of the storage system 104. For example, such sparse elements can correspond to importance values equal to zero (0) for certain unique terms included in the respective logs.

As depicted in block 208, the processing circuitry 110 applies the Cosine Similarity (CS) algorithm to the TF-IDF matrix, and, as depicted in block 210, derives a CS vector for each log from an output of the CS algorithm. For example, each CS vector may include distance (or "similarity") scores for a respective log relative to all the other logs included in the log file. Further, each such similarity score may be determined, as follows:

$$\text{Cosine Similarity} = \frac{A \cdot B}{\|A\| * \|B\|}, \quad (2)$$

in which "A" represents the CS vector of the respective log, and "B" represents a CS vector of one of the other logs included in the log file. As depicted in block 212, the processing circuitry 110 applies the clustering algorithm (e.g., k-means algorithm, DBSCAN algorithm, HDBSCAN algorithm) to the CS vectors for the respective logs, and, as depicted in block 214, derives the plurality of log groupings 126 from an output of the clustering algorithm. Having derived the plurality of log groupings 126, the processing circuitry 110 stores the plurality of log groupings 126 in the memory 114 and/or displays them on the display 112 to system support personnel for subsequent triage and analysis, as depicted in block 216.

The disclosed techniques will be still further understood with reference to the following second illustrative example and FIGS. 1, 3, and 4a-4d. In this second example, it is again assumed that actions or operations performed by the processing circuitry 110 of the storage system 104 (see FIG. 1) are accomplished in most part by software systems that have numerous software components, at least some of which may be subject to failure or abnormal operation over time, and that information pertaining to normal and/or abnormal operation of the software components is saved in the log file store 118 in at least one log file configured to include multiple logs that detail events occurring at the relevant software components.

Figure 3:
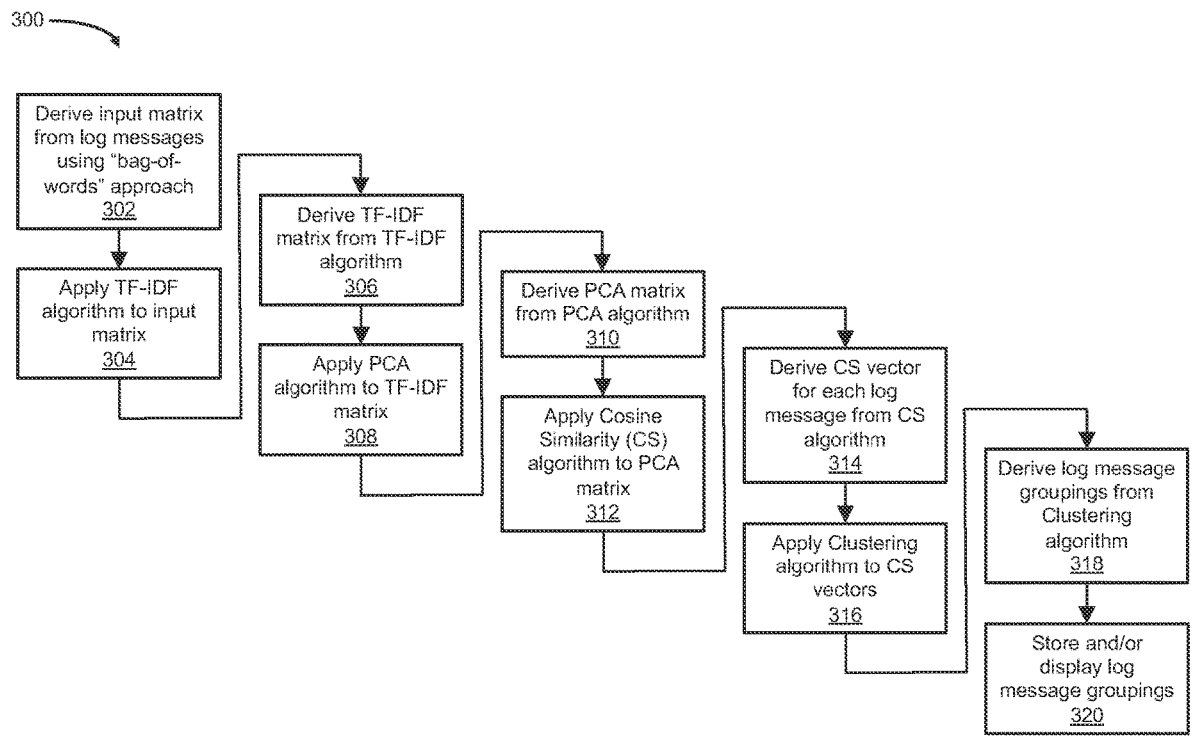
FIG. 3 is a diagram of a second exemplary flow of actions or operations that can be performed by the storage system of FIG. 1 for sorting, classifying, categorizing, or grouping the system log messages using unsupervised ML.

FIG. 3 depicts a second exemplary flow of actions or operations performed by the processing circuitry 110 for sorting, classifying, categorizing, or grouping the logs using unsupervised ML. As depicted in block 302, the processing circuitry 110 derives an input matrix from a dataset of N logs included in the log file using the "bag-of-words" approach. The input matrix includes rows that represent the N logs, columns that represent T unique words, abbreviations, and/or other character strings (or "unique terms") included in the N logs, and counts of the T unique terms in each of the N logs. For example, each row dimension "N" of the input matrix may represent, for a respective log, a vector formed from the counts of the T unique terms in the respective log. As depicted in block 304, the processing circuitry 110 applies the TF-IDF algorithm to the input matrix, and, as depicted in block 306, derives a TF-IDF matrix from an output of the TF-IDF algorithm. As noted in the first example, the TF-IDF matrix can conceptually be viewed as a matrix of size N×T. The TF-IDF matrix further includes information about how important the unique terms are to the respective logs, such importance being determined based on two factors, namely, the Term Frequency (TF) and the Inverse Document Frequency (IDF) of the unique terms. For example, each row dimension "N" of the TF-IDF matrix may represent, for a respective log, a vector formed from importance values (i.e., TF*IDF values) obtained for the unique terms included in the respective log. As further noted in the first example, sparse elements of the TF-IDF matrix can be transformed to a dense matrix to reduce memory requirements of the storage system 104.

In this second example, rather than applying the Cosine Similarity (CS) algorithm to the TF-IDF matrix (as in the first example), the processing circuitry 110 applies the PCA algorithm to the TF-IDF matrix, as depicted in block 308. Further, the processing circuitry 110 derives a PCA matrix from an output of the PCA algorithm, as depicted in block 310. Principal Component Analysis (PCA) is a multivariate statistical method, which is employed herein to effectively reduce the dimension "T" of the TF-IDF matrix to a smaller dimension "R" ("R" being a positive integer) that is fixed to a number of summary indices referred to herein as "Principal Components" (PCs). The PCs are configured to contain information about the variation of each unique term in the dataset, as well as the correlation of each unique term to every other unique term in the dataset. For example, when applied to the exemplary TF-IDF matrix described herein (see reference numeral (1) above), the PCA algorithm may inspect the values reflecting the similarities between the respective logs, and determine that the similarities reflected by the value 0.0882588428775003 are substantially the same for line pairs (0, 15038) and (0, 11588). Further, due to the lack of uniqueness of the logs contained line 15038 and line 11588, the PCA algorithm may remove the dimensions corresponding to lines 15038 and 11588 from the exemplary TF-IDF matrix. In this second example, the PCA matrix can conceptually be viewed as a matrix of size "NxR," in which "R" is less than "T." In effect, the PCA algorithm reduces the dimensionality of the TF-IDF matrix by transforming the TF-IDF matrix of size N×T to a PCA matrix of size N×R, thereby reducing computational requirements of the storage system 104.

As depicted in block 312, the processing circuitry 110 applies the Cosine Similarity (CS) algorithm to the PCA matrix, and, as depicted in block 314, derives a CS vector for each log from an output of the CS algorithm. As in the first example, each CS vector can include distance (or "similarity") scores for a respective log relative to all the other logs included in the log file. However, unlike the first example, the CS vectors are derived from the PCA matrix rather than the TF-IDF matrix. As depicted in block 316, the processing circuitry 110 applies the clustering algorithm (e.g., k-means algorithm, DBSCAN algorithm, HDBSCAN algorithm) to the CS vectors for the respective logs, and, as depicted in block 318, derives the plurality of log groupings 126 from an output of the clustering algorithm.

FIGS. 4a, 4b, 4c, and 4d depict exemplary log groupings 400a, 400b, 400c, and 400d, respectively, which are derived from the output of the clustering algorithm. In this second example, it is assumed that there are four (4) software components of the storage system 104 for which logs are desired to be categorized or grouped, namely, "systemd" (see FIG. 4a), "BSC_fireman" (see FIG. 4b), "cyc_crypto" (see FIG. 4c), and "ipsec" (see FIG. 4d). FIG. 4a depicts the log grouping 400a, which includes three (3) logs pertaining to the operation of the software component, "systemd," and FIG. 4b depicts the log grouping 400b, which includes five (5) logs pertaining to the operation of the software component, "BSC_fireman." Further, FIG. 4c depicts the log grouping 400c, which includes four (4) logs pertaining to the operation of the software component, "cyc_crypto," and FIG. 4d depicts the log grouping 400d, which includes four (4) logs pertaining to the operation of the software component, "ipsec." It is noted that, in this second example, the various logs for the four (4) software components (e.g., systemd, BSC_fireman, cyc_crypto, ipsec) are categorized or grouped, as illustrated in FIGS. 4a-4d, based at least in part on the similarity scores included in the CS vectors for the respective logs. Having derived the log groupings 400a, 400b, 400c, 400d, the processing circuitry 110 stores the log groupings 400a, 400b, 400c, 400d in the memory 114 and/or displays them on the display 112 to system support personnel for subsequent triage and analysis, as depicted in block 320.

Figure 5:
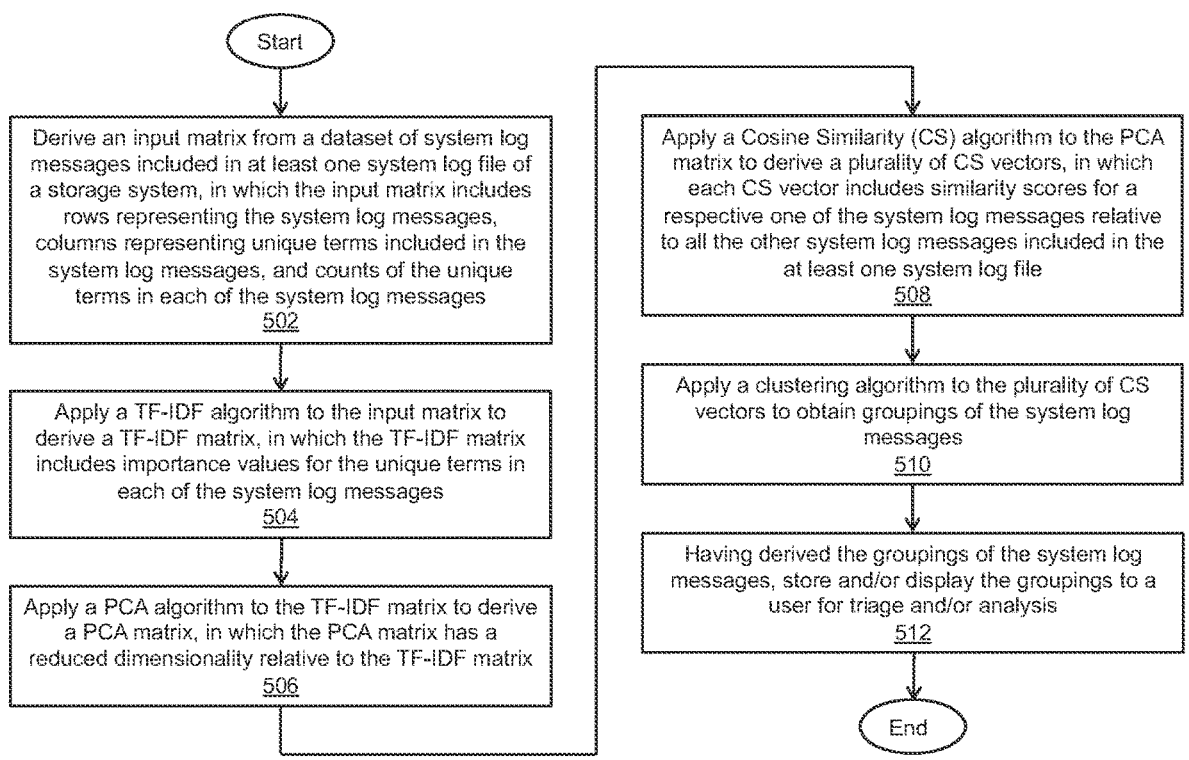
FIG. 5 is a flow diagram of an exemplary method of sorting, classifying, categorizing, or grouping system log messages in a storage system using unsupervised ML.

A method of sorting, classifying, categorizing, or grouping system log messages in a storage system using unsupervised machine learning (ML) is described below with reference to FIG. 5. As depicted in block 502, an input matrix is derived from a dataset of system log messages included in at least one system log file of a storage system, in which the input matrix includes rows representing the system log messages, columns representing unique terms included in the system log messages, and counts of the unique terms in each of the system log messages. As depicted in block 504, a TF-IDF algorithm is applied to the input matrix to derive a TF-IDF matrix, in which the TF-IDF matrix includes importance values for the unique terms in each of the system log messages. As depicted in block 506, a PCA algorithm is applied to the TF-IDF matrix to derive a PCA matrix, in which the PCA matrix has a reduced dimensionality relative to the TF-IDF matrix. As depicted in block 508, a Cosine Similarity (CS) algorithm is applied to the PCA matrix to derive a plurality of CS vectors, in which each CS vector includes similarity scores for a respective one of the system log messages relative to all the other system log messages included in the at least one system log file. As depicted in block 510, a clustering algorithm is applied to the plurality of CS vectors to obtain groupings of the system log messages. As depicted in block 512, having derived the groupings of the system log messages, the groupings are stored and/or displayed to a user for triage and/or analysis.

Having described the above illustrative embodiments, various alternative embodiments and/or variations may be made and/or practiced. For example, it was described herein with reference to an illustrative example that there can be four (4) software components of the storage system 104 for which logs are desired to be categorized or grouped. It was further described herein with reference to the illustrative example that a clustering algorithm such as the k-means algorithm, DBSCAN algorithm, or MB SCAN algorithm can be applied to the CS vectors for the respective logs. In one embodiment, if the k-means algorithm is employed as the clustering algorithm, then a user can specify a fixed number of log groupings before applying the clustering algorithm. In another embodiment, if the DB SCAN or MB SCAN algorithm is employed as the clustering algorithm, then the user can specify a minimum number of log groupings before applying the clustering algorithm. It is noted that the specified number of log groupings can influence the degree to which the PCA algorithm reduces the dimensionality of the TF-IDF matrix.

It was further described herein that Principal Component Analysis (PCA) can be employed to effectively reduce the dimension "T" of the TF-IDF matrix to a smaller dimension "R," which is fixed to the number of Principal Components (PCs). In one embodiment, the dimension "R" (e.g., the number of PCs) can be approximately twice the specified number of categories into which the logs are to be grouped.

Several definitions of terms are provided below for the purpose of aiding the understanding of the foregoing description, as well as the claims set forth herein.

As employed herein, the term "storage system" is intended to be broadly construed so as to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a volume (VOL), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive, a disk, or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storages, a combination of hard drives, flash storage, and other storage devices, or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, or to exclude the incorporation of features from other embodiments. In addition, the term "optionally" is employed herein to mean that a feature or process, etc., is provided in certain embodiments and not provided in other embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
deriving an input matrix from a dataset of system log messages included in at least one system log file of a storage system, the input matrix including rows representing the system log messages, columns representing unique terms included in the system log messages, and counts of the unique terms in each of the system log messages;
applying a Term Frequency—Inverse Document Frequency (TF-IDF) algorithm to the input matrix to derive a TF-IDF matrix, the TF-IDF matrix including importance values for the unique terms in each of the system log messages;
applying a Cosine Similarity (CS) algorithm to the TF-IDF matrix to derive a plurality of CS vectors, each CS vector including similarity scores for a respective one of the system log messages relative to all the other system log messages included in the at least one system log file;
applying a clustering algorithm to the plurality of CS vectors to obtain groupings of the system log messages; and
having derived the groupings of the system log messages, storing and/or displaying the groupings to a user for triage and/or analysis.

2. The method of claim 1 further comprising:
reducing a dimensionality of the TF-IDF matrix.

3. The method of claim 2 wherein reducing the dimensionality of the TF-IDF matrix includes applying a Principal Component Analysis (PCA) algorithm to the TF-IDF matrix.

4. The method of claim 3 wherein applying the CS algorithm to the TF-IDF matrix to derive the plurality of CS vectors includes applying an output of the PCA algorithm as input to the CS algorithm to derive the plurality of CS vectors.

5. The method of claim 4 wherein the output of the PCA algorithm includes a plurality of summary indices referred to as principal components, and wherein a total number of the principal components is approximately two times a number of groupings of the system log messages.

6. The method of claim 1 wherein the TF-IDF matrix is configured as a sparse TF-IDF matrix, and wherein the method further comprises:
transforming the sparse TF-IDF matrix into a dense TF-IDF matrix,
wherein applying the CS algorithm to the TF-IDF matrix to derive the plurality of CS vectors includes applying the CS algorithm to the dense TF-IDF matrix to derive the plurality of CS vectors.

7. The method of claim 1 further comprising:
specifying a fixed number of groupings of the system log messages,
wherein applying the clustering algorithm to the plurality of CS vectors to obtain the groupings of the system log messages includes applying the clustering algorithm to the plurality of CS vectors to obtain the fixed number of groupings of the system log messages.

8. The method of claim 1 further comprising:
specifying a minimum number of groupings of the system log messages,
wherein applying the clustering algorithm to the plurality of CS vectors to obtain the groupings of the system log messages includes applying the clustering algorithm to the plurality of CS vectors to obtain the minimum number of groupings of the system log messages.

9. A system comprising:
a memory; and
processing circuitry configured to execute program instructions out of the memory to:
derive an input matrix from a dataset of system log messages included in at least one system log file of a storage system, the input matrix including rows representing the system log messages, columns representing unique terms included in the system log messages, and counts of the unique terms in each of the system log messages;
apply a Term Frequency—Inverse Document Frequency (TF-IDF) algorithm to the input matrix to derive a TF-IDF matrix, the TF-IDF matrix including importance values for the unique terms in each of the system log messages;
apply a Cosine Similarity (CS) algorithm to the TF-IDF matrix to derive a plurality of CS vectors, each CS vector including similarity scores for a respective one of the system log messages relative to all the other system log messages included in the at least one system log file;
apply a clustering algorithm to the plurality of CS vectors to obtain groupings of the system log messages; and
having derived the groupings of the system log messages, store and/or display the groupings to a user for triage and/or analysis.

10. The system of claim 9 wherein the processing circuitry is further configured to execute the program instructions out of the memory to reduce a dimensionality of the TF-IDF matrix.

11. The system of claim 10 wherein the processing circuitry is further configured to execute the program instructions out of the memory to apply a Principal Component Analysis (PCA) algorithm to the TF-IDF matrix.

12. The system of claim 11 wherein the processing circuitry is further configured to execute the program instructions out of the memory to apply an output of the PCA algorithm as input to the CS algorithm to derive the plurality of CS vectors.

13. The system of claim 12 wherein the output of the PCA algorithm includes a plurality of summary indices referred to as principal components, and wherein a total number of the principal components is approximately two times a number of groupings of the system log messages.

14. The system of claim 9 wherein the TF-IDF matrix is configured as a sparse TF-IDF matrix, and wherein the processing circuitry is further configured to execute the program instructions out of the memory to:
   transform the sparse TF-IDF matrix into a dense TF-IDF matrix; and
   apply the CS algorithm to the dense TF-IDF matrix to derive the plurality of CS vectors.

15. The system of claim 9 wherein the processing circuitry is further configured to execute the program instructions out of the memory to:
   specify a fixed number of groupings of the system log messages; and
   apply the clustering algorithm to the plurality of CS vectors to obtain the fixed number of groupings of the system log messages.

16. The system of claim 9 wherein the processing circuitry is further configured to execute the program instructions out of the memory to:
   specify a minimum number of groupings of the system log messages; and
   apply the clustering algorithm to the plurality of CS vectors to obtain the minimum number of groupings of the system log messages.

17. A computer program product including a set of non-transitory, computer-readable media having instructions that, when executed by processing circuitry, cause the processing circuitry to perform a method comprising:
   deriving an input matrix from a dataset of system log messages included in at least one system log file of a storage system, the input matrix including rows representing the system log messages, columns representing unique terms included in the system log messages, and counts of the unique terms in each of the system log messages;
   applying a Term Frequency—Inverse Document Frequency (TF-IDF) algorithm to the input matrix to derive a TF-IDF matrix, the TF-IDF matrix including importance values for the unique terms in each of the system log messages;
   applying a Cosine Similarity (CS) algorithm to the TF-IDF matrix to derive a plurality of CS vectors, each CS vector including similarity scores for a respective one of the system log messages relative to all the other system log messages included in the at least one system log file;
   applying a clustering algorithm to the plurality of CS vectors to obtain groupings of the system log messages; and
   having derived the groupings of the system log messages, storing and/or displaying the groupings to a user for triage and/or analysis.

18. The computer program product of claim 17 wherein the method further comprises:
   reducing a dimensionality of the TF-IDF matrix.

19. The computer program product of claim 18 wherein reducing the dimensionality of the TF-IDF matrix includes applying a Principal Component Analysis (PCA) algorithm to the TF-IDF matrix.

20. The computer program product of claim 19 wherein applying the CS algorithm to the TF-IDF matrix to derive the plurality of CS vectors includes applying an output of the PCA algorithm as input to the CS algorithm to derive the plurality of CS vectors.

* * * * *